Figure 1:
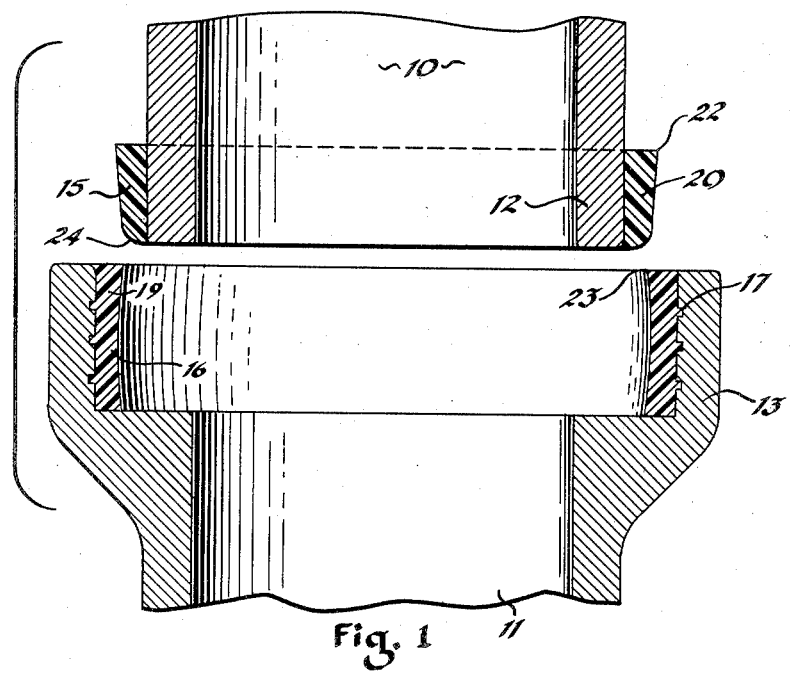

Nov. 13, 1956 — R. B. CLEVERLY — 2,770,476
PLASTIC INTERLOCKING SEALING
MEANS FOR SEWER PIPE JOINTS
Filed Sept. 8, 1953

INVENTOR.
Robert B. Cleverly
BY
Hyde, Meyer, Baldwin & Doran
ATTORNEYS

United States Patent Office 2,770,476
Patented Nov. 13, 1956

2,770,476

PLASTIC INTERLOCKING SEALING MEANS FOR SEWER PIPE JOINTS

Robert B. Cleverly, East Liverpool, Ohio, assignor to American Vitrified Products Company, Cleveland, Ohio, a corporation of New Jersey Application September 8, 1953, Serial No. 378,952

7 Claims. (Cl. 285—231)

This invention relates to sealing means for the bell and spigot ends of sewer pipe sections which are telescopically assembled.

The invention has for its primary object the provision of sewer pipe joint sealing means which is characterized by its structural simplicity, the economy of its manufacture, the rapidity and convenience with which its parts can be assembled for joint sealing purposes, and the effective and durable sealing of the joint.

A further and more specific object of the present invention is the provision of sewer pipe joint sealing means which comprises two concentric, annular elements of deformable and resilient plastic material, one of said elements being in the form of a lining secured within the bell of one pipe section and the other of said elements being in the form of a facing collar secured upon the spigot of the adjoining pipe section, and which sealing elements, as the pipe sections are brought together, seat telescopically, one within the other, and by filling the annular space between the overlapping faces of the two pipe sections, effect a durable gas and liquid tight sealing of the joint.

A further and more specific object of the present invention is the provision of sewer pipe joint sealing means in which the two concentric and interfitting elements thereof do not require, for their joint sealing function, the use of any extraneous solvents, adhering agents or the like, even though the securement of said concentric joint sealing elements to their respective pipe sections occurred long prior to the time when said elements are assembled for joint sealing purposes.

A further and more specific object of the present invention is the provision of sewer pipe joint sealing elements which possess sufficient deformability, resiliency, flexibility and toughness to take care of all reasonable dimensional variations in the sewer pipe sections with which they are used and to take care of all reasonable alignment variations in the sewer pipe sections, both at the time and after the sewer pipe sections are laid.

A further and more specific object of the present invention is the provision of sewer pipe joint sealing means in which the concentric and interfitting joint sealing elements are of such external shape or contour, particularly as to their interengaging surfaces, that when said elements are in their interfitting, joint sealing relationship, the collar element is tightly wedged within the lining element and a portion of said lining element laterally overlies the rear end of said collar element, to thereby provide a most durable assembly of said elements and a most durable and effective joint seal.

Further objects of the present invention, and certain of its practical advantages, will be referred to in or will be evident from the following description of one embodiment thereof, as illustrated in the accompanying drawing, in which—

Figure 2:
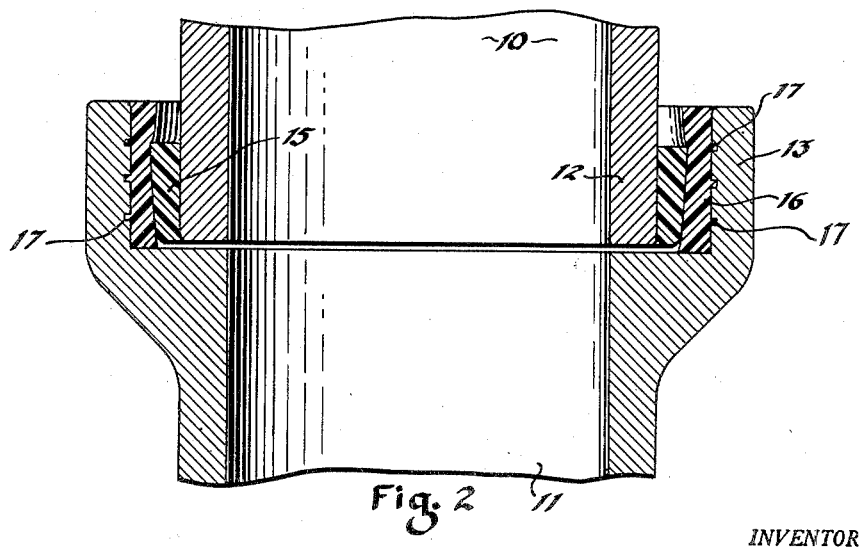

Fig. 1 is a longitudinal sectional view of the bell and spigot ends of two sewer pipe sections provided with joint sealing elements embodying one form of the present invention, the two pipe sections being slightly separated in axial alignment, which is the position which they occupy just prior to their telescopic assembly; and Fig. 2 is a longitudinal sectional view of the assembled sewer pipe sections, with the joint thereof sealed in accordance with such embodiment of the present invention.

Before the particular sewer pipe joint sealing means here illustrated is specifically described, it is to be understood that joint sealing means embodying the present invention may take other forms. It also is to be understood that the terminology or phraseology herein used is for purposes of description and not of limitation, as the scope of the present invention is denoted by the appended claims.

In the accompanying drawing, wherein like reference numerals designate like parts throughout, 10 and 11 designate two sewer pipe sections which are to be telescopically assembled by inserting the spigot end 12 of section 10 into the bell end 13 of section 11. As is usual, the two sewer pipe sections 10 and 11, of ceramic material or the like, are of duplicate form, in that each has a spigot end and a bell end.

To fill the annular space between the overlapping faces of the two pipe sections when their spigot and bell ends are telescopically assembled, as in Fig. 2, and to thereby effect a durable and efficient sealing of the joint provided by such telescopic assembly, there are molded or otherwise firmly and permanently secured to the two pipe sections, in accordance with the present invention, two concentric, annular joint sealing elements.

One such element, here designated by the reference numeral 15, is in the form of a facing collar surrounding the spigot end 12 of pipe section 10, and the other such element, here designated by the reference numeral 16, is in the form of a lining secured within the bell 13 of pipe section 11. To aid in the securement of such elements to their respective pipe sections, the pipe section surfaces engaged thereby may be suitably roughened, grooved or the like, a series of annular grooves 17 being here shown as formed in the bell wall of pipe section 11 to cause the lining element 16 to be securely interlocked with such bell wall.

The joint sealing elements 15 and 16 may be made of any suitable plastic material, such as a polyvinyl chloride plastisol, for example. Plastisols having a durometer hardness of 40 to 50 (Shore type A2 determination), and a 30% maximum compression set (ASTM 394–49T, method B determination) are preferred, inasmuch as they will then possess the desired deformability, resiliency, flexibility and toughness to insure a joint seal of particularly durable and effective character, insofar as the material of the joint sealing elements 15 and 16 is concerned.

Of greater importance, however, to the effectiveness of joint seals embodying the present invention is the shape or contour of the joint-sealing elements 15 and 16, and particularly those surfaces thereof which are in interengagement, namely, the inner side wall surface 19 of the lining element 16 and the outer side wall surface 20 of the collar element 15.

In the present embodiment of the invention, which is regarded as the preferred embodiment, the inner side wall surface 19 of the lining element 16 is of axially concave form, as best shown in Fig. 1, and the outer side wall surface 20 of the collar element 15 is of inwardly or convergently tapered form, as best shown in Fig. 1. Also, the outside diameter of the collar element at its rear edge 22 is somewhat greater, such as by .123 to .127 of an inch, than the inside diameter of the lining element at its rear edge 23, and the length of said collar element is substantially less than that of said lining element. As a result, when the collar element and the lining element are endwise forced together to put them in telescopic relationship for joint sealing purposes, as in Fig. 2, said collar element is not only tightly wedged within said lining element, but also, the rear portion of said lining element laterally overlies the outer marginal edge portion of the rear end wall of said collar element. Thus, the collar element is interlockingly held within said lining element, with no likelihood of accidental separation of said elements, as will be evident from Fig. 2 and as will be readily understood.

For use with sewer pipe sections of the well-known four inch internal diameter size, such as is here illustrated, the collar element 15 may have a wall thickness of approximately three-eighths of an inch, a length of approximately one inch, and a forwardly converging taper on its outer side wall surface 20 of approximately five degrees, although such taper may be from three to nine degrees. To facilitate the centering of the collar element with respect to the lining element 16 and to aid in the insertion of such collar into said lining element, the outer forward edge 24 of the said collar element may be of rounded form, with a radius, for example, of approximately one-fourth of an inch, as best shown in Fig. 1. As to the lining element 16, it may have a wall thickness of approximately five-fifteenths of an inch, a length of approximately one and one-half inches, and an axial concavity of its inner side wall 19 such as is produced by a surface of approximately seven and fifteen-sixteenths inch radius, with the maximum diameter of such surface equidistant from the end edges thereof.

With collar and lining members of such size and contour, and of a material such as a polyvinyl chloride plastisol heretofore referred to, a joint seal is provided which is of exceptional effectiveness and durability. Moreover, the joint sealing elements are sufficiently tough to withstand all normal handling, etc. of the sewer pipe sections prior to their use and also, sufficiently deformable, resilient and flexible to take care of all normal variations in dimensions and alignment of the sewer pipe sections. The joint sealing elements may be readily positioned in their telescopic, joint sealing relationship by simple relative endwise movement of the two elements, although it will require, of course, the use of some force to effect such telescopic assembly.

To those skilled in the art to which the present invention relates, further features and advantages of joint sealing elements embodying the present invention will be evident from the foregoing description of one such embodiment.

What I claim is:

1. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining secured within the bell end of said other pipe section, the collar element having a tapering outer side wall and being wedged within said lining element for joint-forming purposes, the said lining element having an axially concave inner side wall, with the center of curvature of such inner side wall being substantially equidistant from the ends of the lining element.

2. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining, of a length substantially greater than that of the collar element, secured within the bell end of said other pipe section and having a curved inner side wall, the collar element having a tapering outer side wall and being wedged within said lining element for joint-forming purposes, the outside diameter of said collar element at its rear edge being greater than the inside diameter of said lining element at its rear edge to thereby enable the lining element to laterally overlie a part of the rear end of the collar element for the production of an interlocking effect.

3. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining, of a length greater than that of the collar element, secured within the bell end of said other pipe section, the collar element having a tapering outer side wall and being wedged within said lining element for joint forming purposes, the said lining element having an axially concave inner side wall, the outside diameter of said collar element at its rear edge being greater than the inside diameter of said lining element at its rear edge to thereby enable the lining element to laterally overlie a part of the rear end of the collar element for the production of an interlocking effect.

4. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining secured within the bell end of said other pipe section, the collar element having an outer side wall with a converging taper in the range of three to nine degrees and being wedged within said lining element for joint forming purposes, the said lining element having an axially concave inner wall, with the center of curvature of such inner wall being substantially equidistant from the ends of the lining element.

5. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining secured within the bell end of said other pipe section and having a length of approximately an inch and a half, the collar element having a tapering outer side wall and being wedged within said lining element for joint-forming purposes, the said lining element having an axially concave inner side wall as provided by a surface of revolution of approximately seven and fifteen-sixteenths of an inch radius, the said lining element being substantially symmetrical on opposite sides of its transverse central axis.

6. In a pipe joint between the bell end of one pipe section and the spigot end of an adjoining pipe section, a pair of annular sealing elements of deformable resilient material, one being in the form of a collar secured to the spigot end of said one pipe section and the other being in the form of a lining secured within the bell end of said other pipe section and having a length of approximately an inch and a half, the collar element having an outer side wall with a converging taper in the range of three to seven degrees and being wedged within said lining element for joint-forming purposes, the said lining element having an axially concave inner side wall as provided by a surface of revolution of approximately seven and fifteen-sixteenths of an inch radius, the said lining element being substantially symmetrical on opposite sides of its transverse central axis.

7. In a pipe joint between the bell end of one pipe section and the spigot end of an adjoining pipe section, a pair of annular sealing elements of deformable resilient material, one being in the form of a collar, with a length of approximately one inch, secured to the spigot end of said one pipe section and the other being in the form of a lining, with a length of approximately one and one-half inches, secured within the bell end of said other pipe section, the collar element having a five degree tapering outer side wall and being wedged within said lining element for joint-forming purposes, the said lining element having an axially concave inner side wall as provided by a surface of revolution of approximately seven and fifteen-sixteenths of an inch radius, the center of curvature of said inner side wall being substantially equidistant from the ends of said lining element, and the outside diameter of said collar element at its rear edge being greater, such as by an amount in the neighborhood of one-eighth of an inch, than the inside diameter of the lining element at its rear edge, to thereby enable the lining element to laterally overlie a part of the rear end of the collar element for the production of an interlocking effect.

References Cited in the file of this patent

UNITED STATES PATENTS

| | | |
|---|---|---|
| 1,974,780 | Mann | Sept. 25, 1934 |
| 2,271,936 | Carson | Feb. 3, 1942 |
| 2,285,046 | Murdock | June 2, 1942 |